S. C. Salisbury.
Boiler Furnace.
Nº 88,081.      Patented Mar. 23, 1869.
Fig. 1.
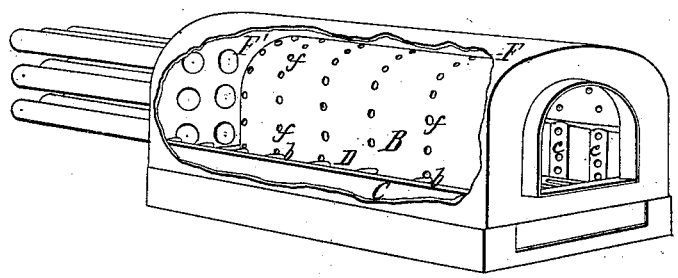
Fig. 6.    Fig. 5.      Fig. 2.
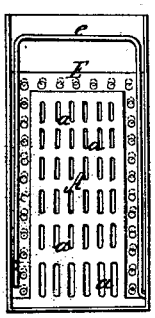 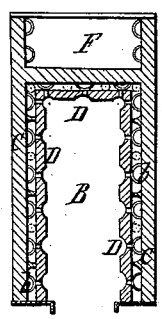 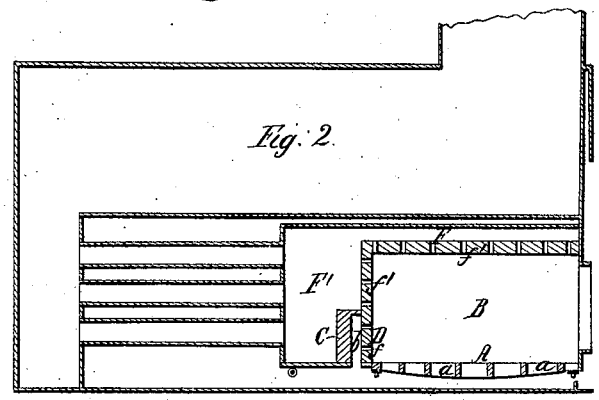
Fig. 4.      Fig. 3.
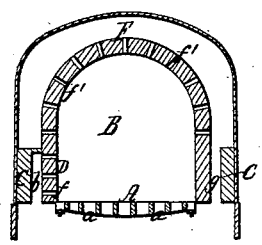 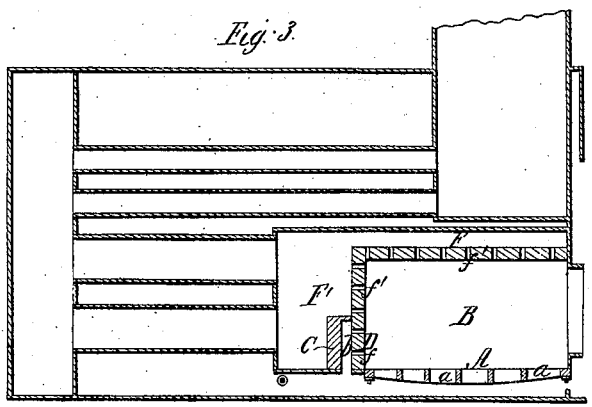
Witnesses;      Inventor;
S. D. Law      Silus C. Salisbury
Fred B. Sears.

though not distinctly to be seen in the drawings, but fully described, and shown on a larger scale in other patents granted to me, the air passing up through such tubes $b$, is highly heated, and being thrown horizontally into the preparing-chamber B, mixes thoroughly with the gas generated from the coal.

United States Patent Office.

SILAS C. SALISBURY, OF NEW YORK, N. Y.

Letters Patent No. 88,081, dated March 23, 1869.

---

IMPROVEMENT IN FURNACES FOR HORIZONTAL STEAM-GENERATORS.

---

The Schedule referred to in these Letters Patent and making part of the same.

---

*To all whom it may concern:*

Be it known that I, SILAS C. SALISBURY, of the city of New York, in the county of New York, and State of New York, have invented certain new and useful Improvements in Furnaces for Burning Fuel, for Application to Horizontal Steam-Boilers; and I do hereby declare that the following is a full, clear, and exact description thereof, and of their mode or manner of operation, reference being had to the accompanying drawings, and to the letters of reference marked thereon, and making a part of this specification.

The object of this invention is to secure the greatest economy in the use of fuel, and make the same effective, to the greatest possible degree, in the generation of steam; and this I accomplish by such a construction and arrangement of the fire and combustion-chambers of the furnace, whereby I am enabled to secure a better combustion of the fuel, and which is effected by both mechanical and chemical means, acting in combination with each other.

In furnaces, as heretofore generally constructed and arranged, the combustion of the fuel is so imperfect, that but a comparatively small portion of the fuel is actually consumed and rendered effective, the balance of the fuel passing off in the form of carbonic oxides, (which, at the same time, injure the flues,) or as particles of partially-consumed or unconsumed fuel.

Various attempts have been made to secure more nearly perfect combustion, but the results claimed have been so imperfect and unsatisfactory that such efforts or experiments have found but little favor with the public.

My invention or improvements consist in the combination with and adaptation to a horizontal boiler, whether having direct or return-flues, of a fire, or preparing-chamber, for receiving the fuel, and in which it is slowly decarbonized, oxygen and hydro-oxygen gases being abundantly supplied thereto, to assist such decomposition; and the arrangement, in connection with such preparing-chamber, of a combustion-chamber, into which the carbonic oxides and products of combustion formed or generated in the fire-chamber, pass, in numerous small and divided currents, and where, by means of highly-heated air and decomposed steam, constantly supplied to such chamber, the carbonic oxides are changed in character, and the several gases of the coal, air, and water, are mixed and combined both mechanically and chemically, so that everything combustible may be consumed, and a very intensified heat produced, with a comparatively slow combustion of fuel.

A long series of careful and practical experiments has demonstrated that the use of my invention and improvements effects a great saving, whether anthracite or bituminous coal or wood is used.

The drawings show the application and adaptation of my improvements to horizontal boilers.

Figure 1 is a perspective view of the fire, or preparation-chamber, and of the combustion-chamber of the furnace, a portion of the latter being broken away, as applied to a locomotive-boiler.

Figure 2 is a vertical section of fig. 1, through its centre, taken lengthwise.

Figure 3 is a like view as fig. 2, through a return-flue boiler.

Figure 4 is vertical cross-section of fig. 1.

Figure 5 is a horizontal section of fig. 1, just above the grate.

Figure 6 is a view of fig. 1, from below or under the grate.

The grate A is made of considerable depth, and is formed with numerous openings, or air-passages $a$, so as to admit abundant supply of air from below; and instead of such openings being continuous between the several bars of the grate, I prefer to have them interrupted, as shown in fig. 6, so as to divide the air, as it is admitted, into numerous currents.

The air thus admitted, becomes more or less heated, but at the same time it keeps the under surface of the grate comparatively cool, and thus makes it more durable.

The fire, or preparing-chamber B is constructed substantially as follows:

A heavy plate, or piece, C, of cast-iron, from about half an inch to an inch in thickness, is placed within and against the inner plate of the boiler, extending back as far as the depth of the fire and combustion-chambers, and forming the outer side walls of such chambers, as shown in figs. 1, 4, and 5, and also forming the rear wall of the preparing-chamber, as also shown in said fig. 5, and in figs. 2 and 3; such iron plate extending also upward about as far as the perpendicular sides of such chambers.

On the inner sides of such cast plate C, or made a part of it, is placed, at regular or suitable intervals, say every two inches, a series of pipes, or half-round tubes, $b$, which are open at the bottom, to freely take in air, and closed at the top, to prevent the air passing through them, but having along their inner sides a series of holes, or perforations, $c$, to allow the air to pass out from such tubes horizontally.

A section of one of such tubes, $b$, with its open bottom and closed top, is shown in figs. 2, 3, and 4.

Within such cast, or iron plate C, and in contact with the inner sides of the air-tubes, $b$, is placed the fire-brick lining D, which makes the inner walls of the fire, or preparation-chamber B; the inner surface of such fire-brick being fluted, or formed with concave recesses, so as to prevent the fuel packing against the sides of such material.

Through such fire-brick, on every side of the fire-chamber B, is a series of perforations, or openings, $f$, which correspond in position with, or connect with the perforations $c$, made in the inner sides of the air-tubes $b$.

By means of such air-tubes, $b$, perforated as described, and the corresponding perforations *f*, through the fire-brick D, air is continually supplied to the fire, or preparing-chamber B, and enters such chamber in divided jets, on every side of the burning fuel, both at or near the top thereof, and at different points below.

Large quantities of air are thus not only constantly supplied to the chamber B, but by such arrangement of perforated tubes and perforated fire-brick, in combination with the grate, the air is presented to and distributed through every part of the burning fuel.

The air supplied to the chamber B, through the tubes *b*, also becomes highly heated by passing along the heated surface of the iron plate C, and through the fire-brick lining, and the chamber B is thus, in fact, continually supplied with a hot blast; and to assist in heating the air thus supplied, the tubes *b* may be filled with fine gauze cloth, made of asbestos, which, though continually hot, will not be consumed.

To such chamber, B, there is also admitted, by means of a pipe *e*, extending under the mouths of the tubes *b*, and opening into the same, by small perforations, or jet-tubes, and which pipe connects with the boiler, or any sufficient source of supply, steam or superheated steam, which becomes decomposed in passing into or on entering such chamber, furnishing additional oxygen, and also hydrogen, and thereby assisting to effect a more complete and perfect combustion of the fuel.

By thus supplying the fire, or preparing-chamber on every side thereof, and on the top of and at different points in the burning fuel, with divided jets of heated air, and decomposed or decomposing steam, the decarbonization of the fuel commences or is carried on from the top and from the outside of the mass of fuel, instead of principally from the bottom, and at the same time the intense heat penetrates the centre, and completely effects the same results there.

The combustion being thus carried on most actively from the top and sides of the fire, the under surface of the grate-bars, notwithstanding the great intensity of the fire, remains quite cool, comparatively. In an ordinary furnace, with the fire of the intensity easily and constantly maintained in my fire, or preparing-chamber, the grate-bars would be melted or burned out in a very short time.

The quantity of air and steam supplied to the chamber B, through the tubes *b*, may be regulated and varied by means of a sliding plate, E, so arranged that by its movement the mouths of such tubes *b* may be increased or diminished in size, and the supply of air and steam can be partially or wholly cut off, as desired, and the consumption of fuel can thus be regulated according to circumstances.

The fire, or preparing-chamber B, is wholly arched over, and closed, as shown in figs. 1 to 4, with fire-brick, or some material capable of bearing a high heat without injury; and the enclosing walls and top of such chamber are pierced with numerous holes, or openings *f*, for the purposes hereafter set forth, such openings being about half an inch in diameter.

Above and behind such preparing-chamber B, are two chambers, F F', which I call the combustion-chambers, and communication with such chambers from the chamber B, is only by means of or through the holes, or openings *f*.

The carbonic oxides and products of combustion formed in the interior, or preparing-chamber B, in passing through such openings *f*, are divided into numerous small jets, or currents, and enter the combustion-chamber F at many different angles, and thus are caused to come in more complete and intimate contact with, and are thus more effectually mixed with the jets or currents of heated air and steam which enter such combustion-chamber F F', as well as the fire, or preparing-chamber B.

Such supplies of air and steam are furnished to the combustion-chambers through the spaces, or openings *g*, between the iron plate C and the fire-brick D, and the air-tubes *b*, which, as before described, furnish air and steam to the chamber B.

A section of one of such spaces, *g*, open at the top, to allow the air and steam to pass through it and into the combustion-chambers F F', is shown in fig. 4. As before described, in connection with the fire-chamber B, the air supplied to the combustion-chambers becomes highly heated in passing thereto, and is, in fact, a continuous hot-air blast.

The steam-jets, supplied to such chambers by the pipe *e*, become also wholly, or to a great degree, decomposed, by contact with the highly-heated iron plate C and fire-brick D, and produce hydro-oxygen gases, and thereby increase the quantity of oxygen, and intensify the heat.

The air supplied to the combustion-chambers, becoming highly heated while passing thereto, is rendered lighter than the carbonic oxides, which are continually pouring into such chamber from the fire, or preparing-chamber B, and an immediate chemical union and utilization of such gases of the coal, and air, and steam, take place, and their complete combustion is produced.

The pressure and velocity of the steam escaping from the pipe, also produce or cause an increased draught, and consequently an increased quantity of oxygen is carried in through the tubes *b*, and supplied for combustion.

Actual practical tests clearly demonstrate that such use of steam in the chambers B and F, adds greatly to the economy produced or effected by the general combination.

The quantity of air and steam supplied to the combustion-chambers will also be governed and regulated by the sliding plate before described, in connection with the fire-chamber.

The arch of the fire-chamber B may spring directly from the fire-brick lining D, as shown in fig. 4, within the circuit or line of the spaces *g*, through which the air and steam are supplied to the combustion-chamber; or, if extending over or beyond the line of such spaces, there should be suitable openings, to allow the air and steam to pass freely through such spaces *g* into the combustion-chambers.

As a matter of economy, I prefer to make the side and end pieces of the fire-brick lining D, each in a single piece; and to secure greater strength and durability, these pieces of fire-brick may best be set in a cast-iron foundation, cast with a groove, of the width of the brick, and having a flange, an inch or so high.

The heat and products of combustion pass from the combustion-chamber F', through the tubes G, directly into the smoke-stack, as shown in fig. 2, or through return-flues, as shown in fig. 3; and the smoke-stack, or chimney may be fitted with a damper, as in ordinary cases.

What I claim as my invention, and desire to secure by Letters Patent, is—

1. In combination with a horizontal boiler, or a steam-boiler having horizontal flues, the heating-furnace, consisting of an inner fire, or preparing-chamber B, and the outer, or combustion-chamber F, constructed and arranged substantially as described, whereby atmospheric air, or air and steam combined, can be furnished to both such chambers, and heated in passing thereto, such inner chamber B being also covered with or separated from the outer one by a perforated arch or top, D.

2. The arrangement of the additional combustion-chamber F', at the rear end of the fire, or preparing-chamber B, or extension of the combustion-chamber F, behind the fire-chamber B, substantially as set forth.

SILAS C. SALISBURY.

Witnesses:
S. D. LAW,
FRED. B. SEARS.